Nov. 14, 1939.  A. M. TAYLOR  2,180,264
ELECTRIC POWER TRANSMISSION
Filed March 23, 1936  6 Sheets-Sheet 2
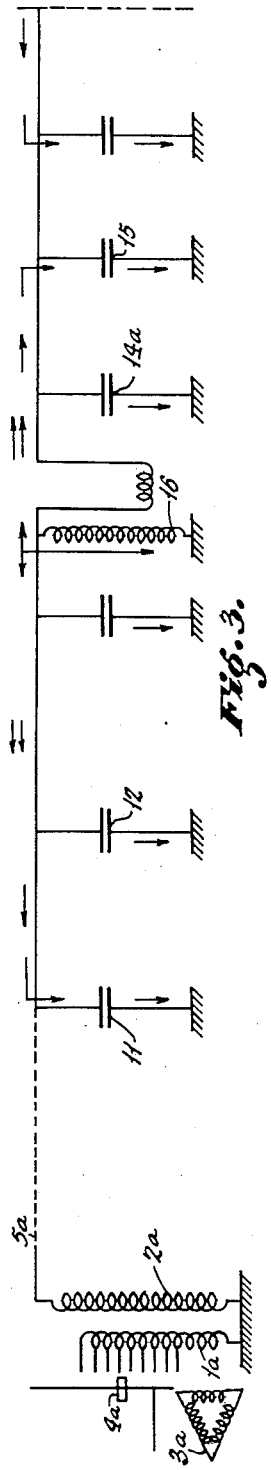
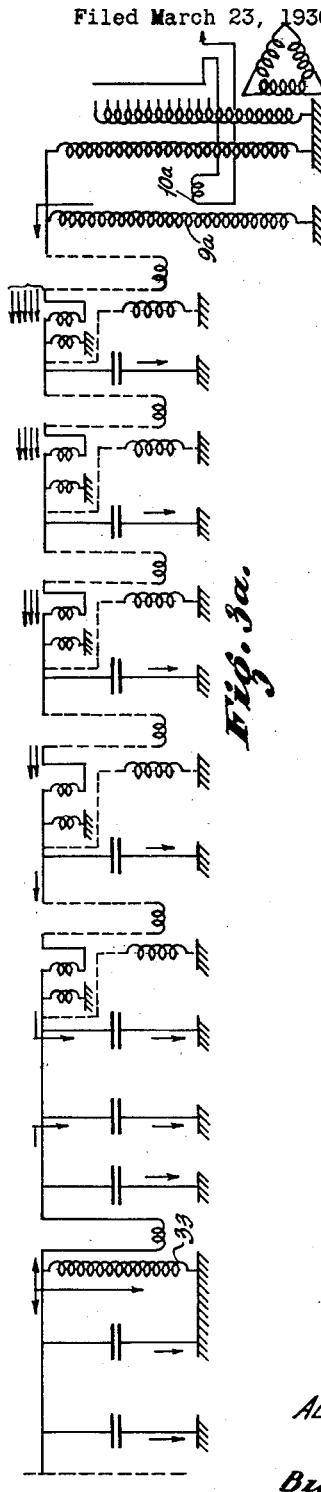
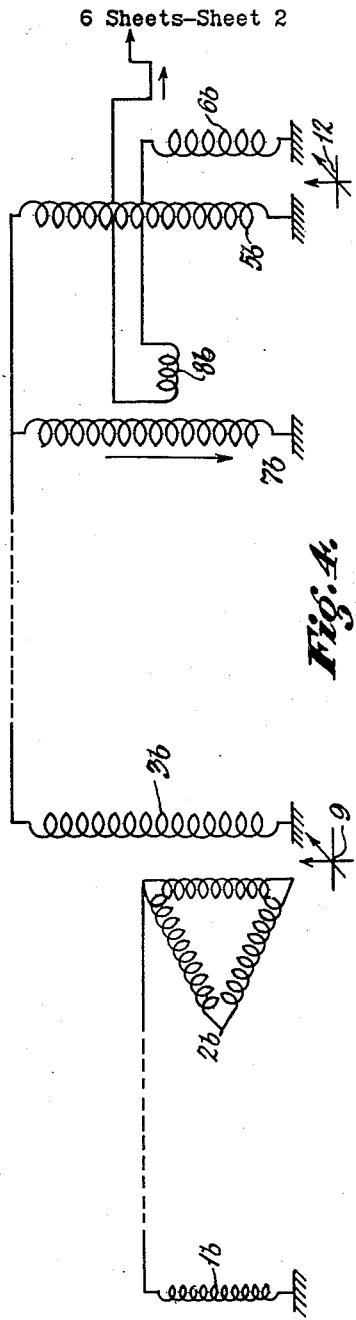
Inventor
ALFRED MILLS TAYLOR
By Baldwin & Wight
his Attorneys.

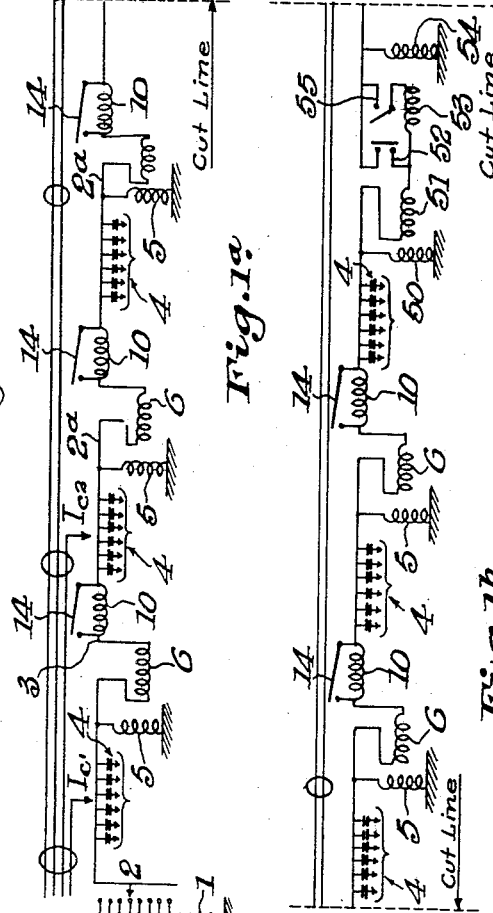

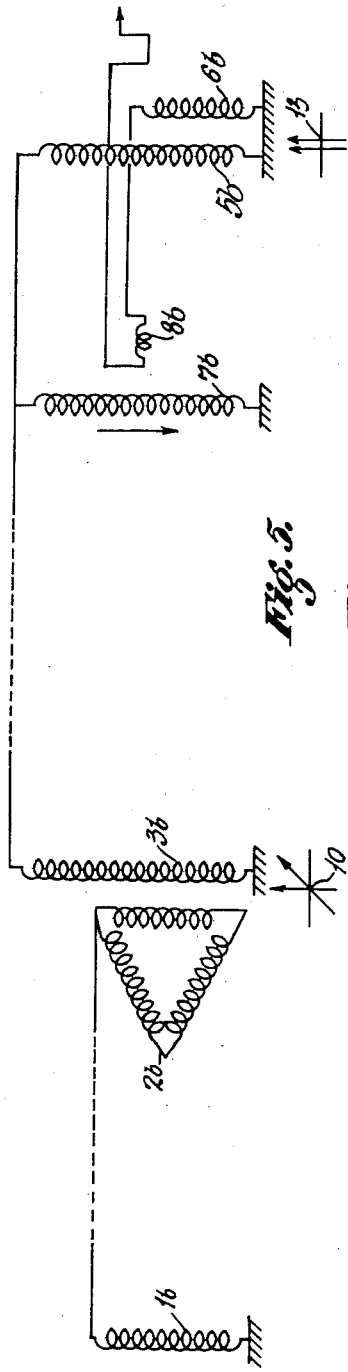
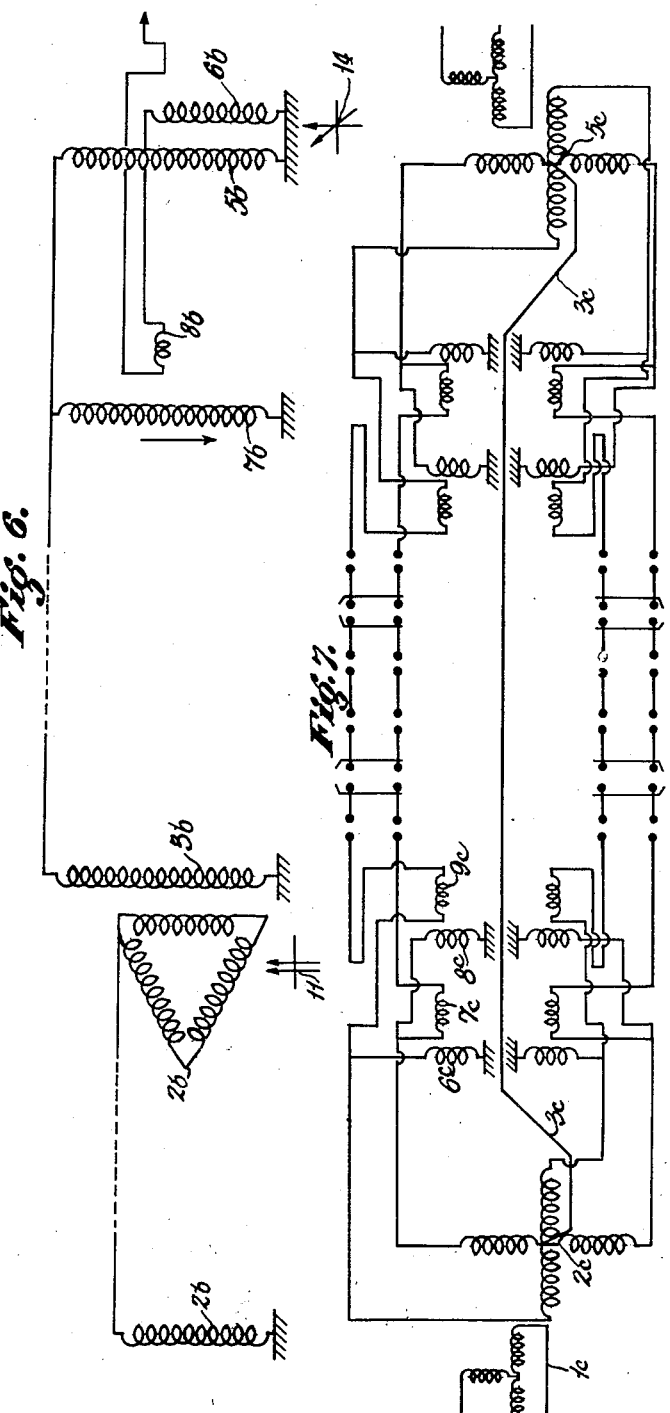

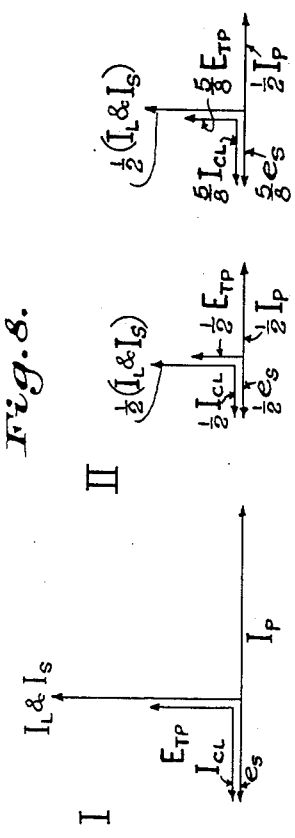
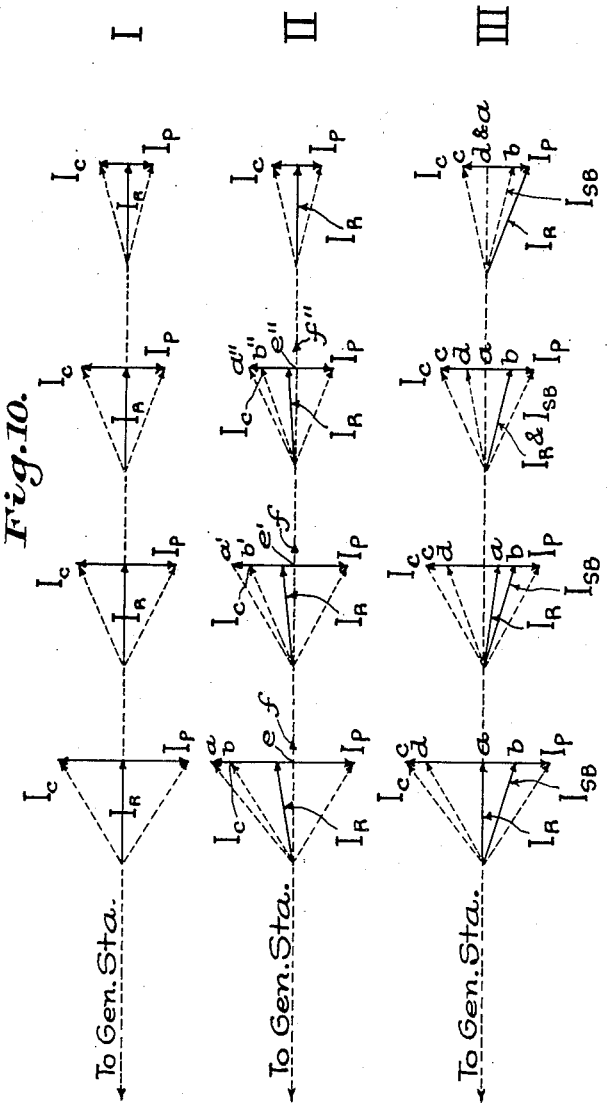
Fig. 8.
Fig. 10.

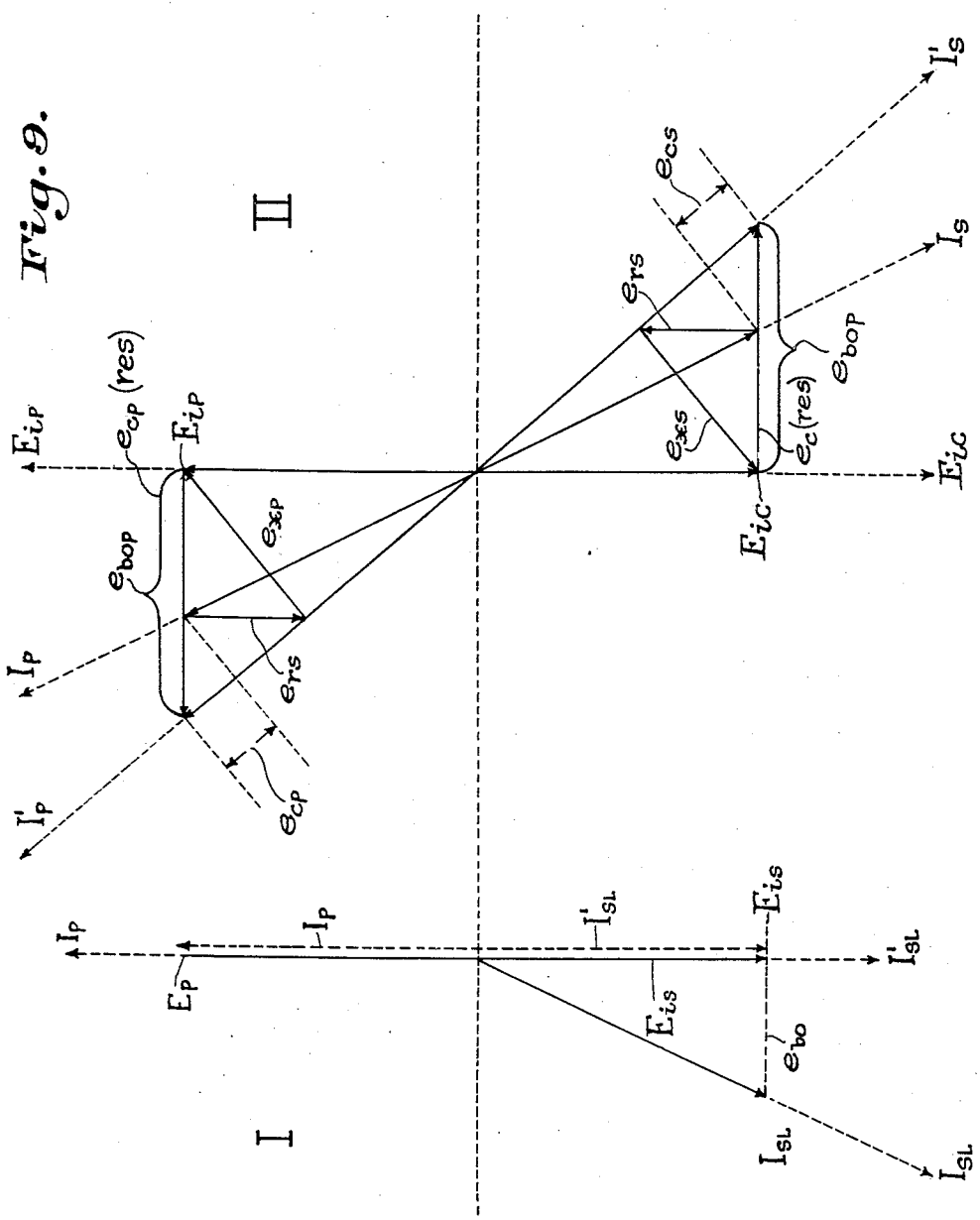

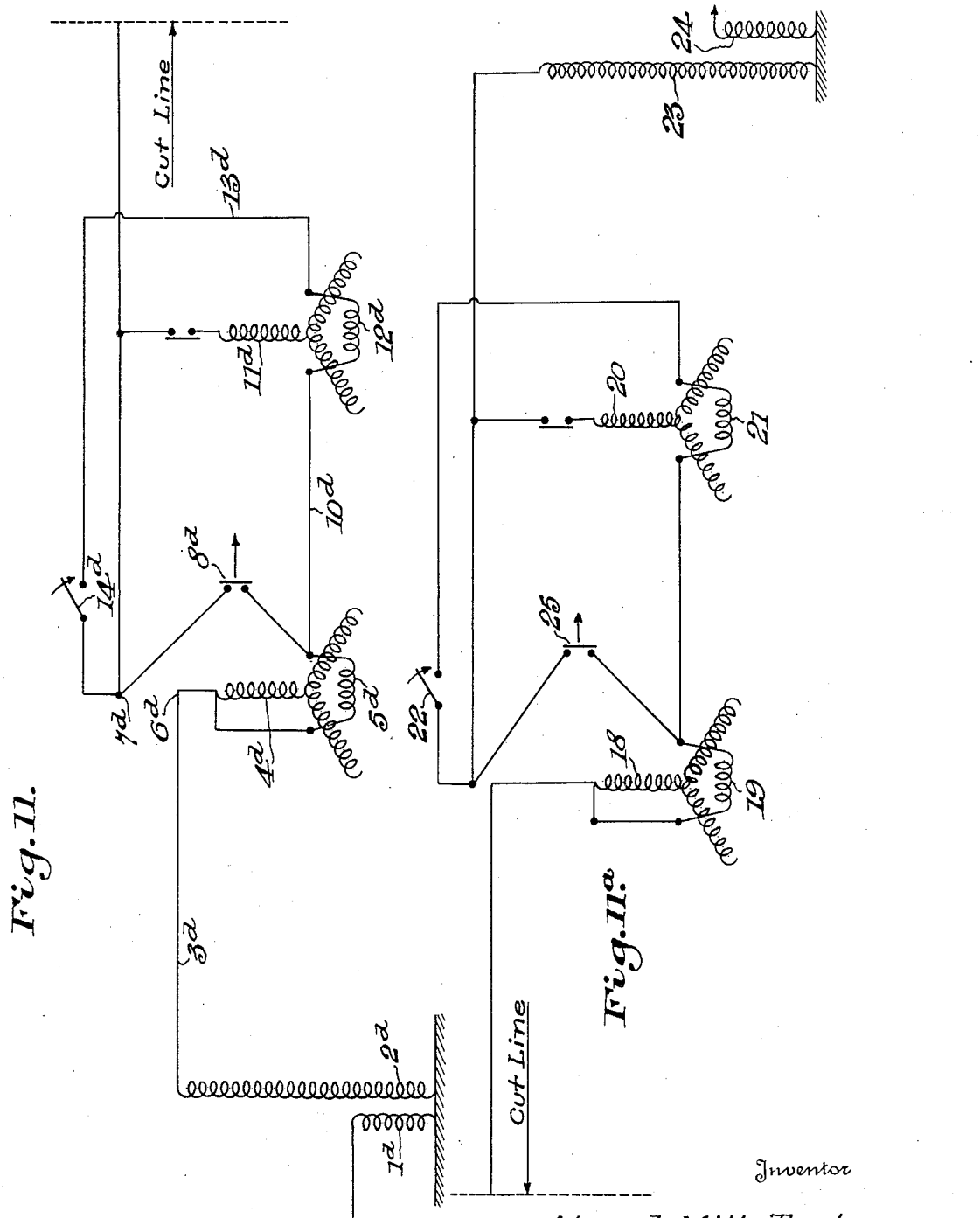

Patented Nov. 14, 1939

2,180,264

UNITED STATES PATENT OFFICE 2,180,264

ELECTRIC POWER TRANSMISSION

Alfred Mills Taylor, Birmingham, England

Application March 23, 1936, Serial No. 70,488
In Great Britain March 29, 1935

2 Claims. (Cl. 172—237)

The object of the present invention is to provide a means for transmitting power over great distances whereby the deleterious effects of inductance in the overhead line can be neutralised without the need for transmitting large lagging or leading currents back to the generating station.

At the present time the only proposed means for the transmission of power on lines of, say 300 to 1000 miles is by the introduction of substations along the line, in which are placed synchronous condensers. By running each synchronous condenser with an over-excited field it can be made to draw from the generating station (up to the point in the line where it is situated) a leading component of wattless current.

This leading component, combining with the component of the load current (considering, for the moment, the section of line nearest to the substation), gives a resultant current in the contiguous section, which has a "lead" over the previous current supplied to substation (i. e., before condenser was added). The resultant voltage generated by the passage of the current in the section thus embodies a small component, which is "in-phase" to the E. M. F. of supply, and a boost is thus imparted to the line, which can be made to compensate for the voltage drop in the line due to the load current traversing "the series impedance of the line."

By this means (still considering the operation of synchronous condensers) the "operating" voltage at each successive point along the line may be brought up to the operating voltage at the commencement of the section; and any departure from the desired "operating" voltage at each point of the line can be caused by means of relays and field regulators, to bring up the fields of the synchronous condensers to the strength necessary to draw the necessary leading current, and so to re-establish that voltage.

This arrangement, however, has certain disadvantages, which become very serious when lines of over 300 miles are attempted:

(1) There is no means of cancelling the existing "natural" capacity current of the line itself, which still has to be brought back to the generating station and which, in lines of 300 miles and over, involves such a serious additional I²R loss in the line as to be prohibitive, when added to the "leading" current demanded by the condensers.

(2) Every additional component of leading current introduced by the synchronous condensers themselves (which is proportional to inductive drop), increases the total amount of capacity current which has to be supplied from the generating station and so increases the consequent additional I²R loss in the line over and above that due to the "natural" capacity current of the line and also that due to the load current.

(3) Since the synchronous condensers are incapable of injecting into the line (in series with the line) any component of quadrature E. M. F. (i. e., quadrature to the voltage of supply), which might be used to correct, or nullify, the quadrature component of voltage set up in the line by the passage of the load current, it follows that, though the voltage at all parts of the line, as measured by a voltmeter, may be the same, there is nevertheless a "phase-twist" set up in that voltage due to the unbalanced reactive quadrature component created by the resultant current in the said section of line and this is repeated and aggravated in the successive sections of the line. This means that the voltage applied to any synchronous motors contained in the "load" fed from the substation is such that the rotors of these motors are operating at a certain phase angle α considerably behind those of the generators, and instability in working is introduced.

For example, assuming that the two lines of transmission (including the "stand-by" line) are each working under normal conditions at their full load rating and that one of the lines develops a short circuit and has to be removed from the circuit and the other line is consequently called on to instantly carry 100% overload, the reactive drop in the remaining line is doubled and the "phase-twist" is also doubled: so that if (α) was previously 60° (as might easily be the case on a long line) it immediately becomes 120°; which is a condition under which the aforesaid motors would fall out of step, and all the synchronous condensers would also fall out of step, commencing at the substation end, and the whole transmission would collapse.

It becomes therefore supremely important to find a means of introducing, in series with the line, such quadrature components of voltage that they neutralize under normal circumstances the reactive components introduced by the passage of the load current through the line; thus eliminating the angle (α) and its accompanying instability. This can be effected by a series of static quadrature boosters introduced into the line in the manner hereinafter described.

These boosters however demand in their primaries (which shunt the line) a quadrature lagging component of current sufficient to excite the booster under conditions of wattless secondary "load". This lagging current passing through the line nullifies the benefits to be derived through the injection of a leading quadrature E. M. F., into the line, and one of the objects of this invention is to balance out the said lagging currents, from the different boosters along the line, by drawing into the booster primaries the capacity currents naturally induced in the line by virtue of its electrostatic charge.

A further object of this invention is to cheapen the cost of the boosters by eliminating regulating gear on said boosters, and the means whereby this can be attained is hereinafter described.

This invention will now be described with reference to the accompanying diagrammatic drawings, in which—

Figs. 1, 1a and 1b show the broad idea of balancing capacity against self-induction along the line.

Fig. 2 shows how, in the application of such an arrangement, means are provided for preserving the balance during variation of load, and also under emergency conditions. By "emergency conditions" is meant the conditions which arise when, for example, lightning strikes one of the two parallel lines and the whole current has to be immediately passed through the one remaining line.

Figs. 3 and 3a show how, where capacity current is in excess it may be utilised for rectifying the P. F. of the substation load, by means of a quadrature booster at the substation.

Fig. 4 carries this further and shows how, by injecting surplus quadrature voltage into the low tension circuit at the substation, i. e. voltage additional to that which would merely give unity P. F., an additional booster current demand may be created, which shall balance out against still larger capacity currents than were considered in Figs. 3 and 3a.

Fig. 5 shows a further stage to which Fig. 4 may be carried and this further increases the booster current demand.

Fig. 6 shows a further stage for the same object.

Fig. 7 shows the arrangement of Fig. 2 applied to 4-phase system.

Fig. 8 is a vector diagram, intended to assist in the understanding of the operations of the regulator shown in Fig. 2.

Fig. 9 is a vector diagram, intended to assist in the understanding of the different stages of boost contemplated in Figs. 4, 5, and 6.

Fig. 10 is a vector diagram intended to assist in the understanding of the way in which the differential booster current is caused to build up in the line a steadily increasing "forward" E. M. F. (to assist the substations) under the action of the regulator described in Fig. 2.

Figs. 11 and 11a are an arrangement showing the emergency boosters and their switching connections.

Referring now in detail to the various drawings:

Figs. 1, 1a and 1b show the general arrangement along the line of any length, in which the secondary winding 1 of the step-up transformer at the generating station end of the line feeds, by means of regulating switch 2, on to one of the line wires 3, which may be connected with one phase of a 3-phase system. The capacity effect, operating as though it were a static condenser, is shown in the group of small arrows marked 4; the totalised effect of this current, flowing to earth (on its way to the two opposite poles of the 3-phase system) is marked on the drawings, $IC^1$.

The primary winding of a quadrature static booster is indicated by 5, and the secondary winding of this booster, which injects the voltage into the line-wire, is indicated by 6. It is the primary of this booster which picks up the condenser current $IC^1$; and if the system has been properly designed according to the method of my invention the primary of the booster will demand, when the booster is injecting its full voltage into the line, a current which is exactly equal and opposite (in phase) to the capacity current $IC^1$. This current is indicated on the drawings by the arrow marked $IX^1$.

Actually, the capacity current does not flow through the ground, as shown, but passes to corresponding booster windings in the two other phases (omitted for the sake of clearness).

At the commencement of each section, for example that marked $2^a$, the secondary 6 of the booster injects the quadrature E. M. F. necessary to cancel out the induced E. M. F. in the section.

Correspondingly, at the substation, the booster whose secondary is marked 8 feeds into the low tension secondary circuit 9 and encounters therein the inductive reactance of the whole secondary low tension system (i. e., of the "load"). This takes the place of the ensuing line reactance alluded to in connection with section $2^a$ of the line.

Under present methods of supplying long-distance lines, there is no attempt made to prevent the capacity current $IC^3$, $IC^7$, $IC^2$ and $IC^1$ from being supplied by the generator at the main station. Consequently, (see upper part of Fig. 1) there is a gradual accumulation of current as the generating station is approached. On extremely long lines, this current is very serious indeed and completely swamps the "load" current. Consequently, $I^2R$ losses in the line are tremendous and transmission becomes commercially impracticable.

One of the objects of the present invention is to, as far as possible, so cancel out this current by the booster primary current that none of it flows back to the generating station.

It will be observed that each of the local circuits 4, 5, forms a closed self-circulating circuit and that no unbalanced current passes along the line; which therefore has to carry nothing but the pure "load" current.

(It should be mentioned that a star/star connection of main transformers is shown for simplicity.)

The adjustable inductive reactances 10, 10, 10 are shown; as also their short circuiting switches 14, 14, 14. (See also under Fig. 2.)

An emergency booster, combined with an ordinary booster (non-emergency type) is shown; where 50 is the primary of the latter, and 51 its secondary; 54 is the primary of the emergency booster and 53 its secondary; 55 is the automatic instantaneous "closing" switch and 52 the automatic instantaneous circuit-breaker. (See also under Fig. 11.)

While a regulating switch 2, on the secondary winding of the step-up transformer, has been shown in Fig. 2 and is, for consistency, repeated here (Fig. 1), it will be understood that this is only for purposes of explanation and because the rather complicated actions that go on (described in Fig. 2) are better explained by assuming the regulating switch to be introduced at that point, as will be seen later.

If the regulating switch is introduced in the field circuit of the exciter of the alternator the main circuit must be extended to the alternator and to its exciter.

Following the parts of this extension from the main transformer to the left hand:

45 is the primary of the main transformer, 35 is the primary winding of a small current transformer whose function it is to feed the small motor 37 with a current which is proportional to the line current, 40 is the armature winding of the main alternator, and 41 is its field winding; 42 is the armature of the exciter and 43 the field winding of the exciter; 34 is the automatic regulating switch which controls the field of the exciter and is rotated by a worm gear which, by a horizontal shaft, receives its motion from the small motor 37. 33 is a clock spring on this shaft which is wound up by the rotation of the motor. 44 is a large battery that supplies the exciter field.

The explanation of the operation of this part of the diagram will be deferred until the explanation of Fig. 2 is given.

Referring now in detail to Fig. 2, the visual representation of the capacity current given in Fig. 1 is omitted, for clearness, but it is assumed to be an exceedingly long line, in which the capacity currents—due to the high voltage necessary—are very heavy. It is also assumed that they are so heavy that it has been necessary to add compensating reactances 10, 10, 10, to increase the inductive reactance of the line and demand a bigger booster primary current than would otherwise be necessary, thus obtaining a balance.

The problem to be solved in Fig. 2 is the question of keeping the booster primary current and the capacity current in balance at other loads than at normal full load.

The sliding regulator shown as 2, in Fig. 2 is the means employed.

It is assumed that by a judicious selection of the transmission voltage and a judicious introduction (if found needful) of compensatory inductive reactance (shown by 10, 10, 10), when the full voltage of the step-up transformer 1 has been applied to the line (represented by the slider 2 being in its top position) the correct voltage, at full load, has been obtained at the terminals of the secondary winding 9 of the step-down transformer at the low tension bus bars at the substation or receiving end of the line; and that, at this load, the total inductive reactance of the overhead line, plus the "compensating" or "artificial" reactance 10, has been balanced out and that, in so doing all pre-arranged, the capacity current and the booster current balance out one another; and that, in fact, we have the conditions indicated in Fig. 1.

It will be understood that the regulating switch 2 is here described as being for the purposes of explanation of what is to follow, at the secondary winding of the step-up transformer. Actually it would preferably be on the field of the exciter of the alternator.

Now, consider that the receiving substation load is halved; and, for the moment, consider the inductances 10 as being part of the line reactance, proper.

Consider the part of the system shown as at section 8ª of the line, and let the switch marked 14 be assumed to be in the "open" position.

Now it will be obvious that, since the load current is halved, and there is no other current in the line to cause reactive drop (this will be more clearly seen in Fig. 3, to follow), the reactive drop previously occurring in section 8ª will be halved. The booster secondary 6 continues, however, still to supply the same voltage as before, its primary being excited to the same degree as before, but it has to drive only half the load current through the line under that voltage.

Consequently, since the K. V. A. of the input must be equal (less losses) to the K. V. A. of the output, the input into the primary will be halved. And, since the voltage of that input remains constant, it follows that the primary current will be halved.

But the capacity current of the line is at present unaltered; therefore we would have a condition of tremendous unbalanced capacity currents flowing back to the generating station; which is not allowable.

Now, consider that the slider 2 has been automatically moved (controlled by the load current) to a position in which it taps only half the voltage of the step-up transformer.

The capacity current for this section of the line will now be half of what it was at full load.

But the effect of putting the line wire on to half the transmitting voltage is to excite the booster core to only half the induction and the secondary voltage is therefore halved.

The K. V. A. developed in the secondary of the booster is now quartered, and therefore also K. V. A. absorbed in its primary. Now half the original primary current (when at full load) multiplied by half the original voltage of supply gives one-quarter the K. V. A. Therefore half the original primary current is the current that now actually flows.

It therefore, follows that, since the capacity current is also half of what it was when at full load, the two currents are still in balance.

The desideratum of balance has thus been obtained; but since we have lowered our voltage of transmission, the substation low tension voltage has also been halved. This might be compensated for by reducing tappings at the sub-station high tension primary winding (which is objectionable), or by increasing tappings on the secondary side of the step-down transformer.

The latter, however, operates to draw a current through the line which is partly lagging.

From the results of an experimental calculation (which would unnecessarily extend this specification) I deduce that, if the slider, instead of moving over a distance downwards which is in strict proportionality with the current (in this case down to one-half the total travel possible) is arranged to traverse over a distance less than this say ⅝ of the downward distance possible enough "leading" current will pass through the reactance of the line to cause the low tension voltage at the sub-station to rise to its original value.

This modification of the voltage on the primary of the booster due to this "non-proportional" movement, is found by calculation to so operate that the movement of the regulator 2 is simply to alter the capacity current.

There is of course an unbalance of current; but, for a practical case, it is only $\frac{1}{10}$ of the half-load booster current, i. e., $\frac{1}{20}$ of the full load current. That is to say, the waste energy in $I^2R$ booster current, i. e., $\frac{1}{20}$ of the full-load capacity loss, in the line is only about $\frac{1}{400}$ of that which would obtain at full load if the capacity current were then unbalanced; as it now is under present methods of working.

Consequently, I design the regulator 2, which is controlled automatically by the load current in the line, in such a way that the proportional motion along the slider is a little less than true proportionally to current would indicate.

For each particular load, I calculate out what differential capacity current had to flow through the line to give the correct substation low tension voltage; and it is easy to design a regulator accordingly and still have it automatically controlled by the current in the line.

The small alteration involved in the characteristics of the current in the line, caused by this "differential" capacity current, would of course have to be allowed for in the calculation.

It will be understood that while the "differential" capacity current may be utilized, within certain limits, to restore substation voltage, at the lower loads, it is inadvisable to employ it much, if anything, below half full load. At this stage, the substation booster, described under Figs. 3 and 3a, may very well be employed to raise the substation voltage; while at the same time it may effectually balance out capacity current. Most lines, however, will not normally be designed to work under half load; as a poor load factor is not suitable for a long distance line. At the same time it is necessary to have means for carrying the load up from zero to full load, and down again to zero, and the substation booster will provide such means.

In the above explanation, the regulating switch has, as already stated earlier, been shown placed on the secondary of the step-up transformer 1, for the purpose of easier explanation of the results accompanying movement of same; and an explanation of the operation of the regulator, if placed in the field of the exciter will now be given.

The regulator 34 now replaces the regulator 2. The regulator carries four sections of resistance, counting from the right-hand terminal.

These four sections are so chosen that their control of the current passing through the exciter field 43 and hence (indirectly) of the current in the generator field 41, is such that when the switch 34 is on the first terminal the voltage on the transmission line would be the same as with the regulator 2 also on its top, or number one, contact.

Also that, when the switch 34 was on the second contact, the voltage of the line would be identical with that given when the switch 2 was on its ¾ voltage contact and so on.

There is no difficulty in designing this, though the action is a bit complicated; and this is why it has been thought clearer to consider a switch 2, whose "proportional" motion (an index of the proportion of the step-up transformer voltage which, under constant generator excitation, is applied to the line) is simpler to conceive when tracing out the complicated actions and reactions in the booster to the changes in line voltage and load current.

The way by which the mechanical control of position of the regulator switch 34 is governed by the current passing in the transmission line will be clear from the diagram. The torque on the small motor 37 is arranged to be proportional to line current. Hence the amount of "wind-up" of the clock spring 33 is also proportional to current.

Hence the degree of angular rotation of the regulator switch (driven, by the worm-gear shown, from the shaft of the small motor) is proportional to current in the line.

Methods of effecting the same result by employing balance beams and sensitive relays can of course be employed in place of the small motor and the clock spring; but the latter indicates the generic idea sufficiently.

The function of the adjustable reactance 10, in Fig. 2 and of the automatic short-circuiting switch 14 in the same figure, requires no further explanation, except to say that, when there is, owing to a very long line (and the necessarily higher voltage employed), a superfluity of capacity current, a large value is given to the reactance 10 in order that, when emergency conditions arise, the short-circuiting of the reactance by the said switch shall make as great a reduction as possible in the inductive reactance left in the circuit under these conditions, when the booster current always tends to predominate over capacity current.

On the other hand it is essential, for operating the line at normal full load at the highest efficiency, that the booster current shall be substantially equal to the capacity current; whereas under emergency conditions, it is not of so much moment that there be a balance.

Consequently the reactance must be capable of adjustment; so that, at full load, an adjustment may be made. This adjustment may be merely of the nature of additional terminals on the reactance (connected with tappings) into which one of the two free ends of a cut line wire is plugged. (The current need not be passing through the reactance at the time the adjustment is being made; an adjusting switch is not therefore necessary and does not, for this cause appear on the diagram.)

The relative phase relations, and values, of voltages and currents, both when the regulator is on the 100%, and the 50% and the 62.5% (⅝) tapping are shown in Fig. 8.

The action of the boosters, under the effect of the varying voltage sent out from the generating station, will be better understood by considering the vector diagrams of Fig. 8. Only one example is given—viz, the case of the load being reduced from full load to half load, as this is typical of the other stages.

At the full load (a synchronous condenser being assumed to impart U. P. F. to the receiver load), in sub-figure I of Fig. 8, ($I_L$) represents the load current entering the substation. The nearest of the regulator line boosters may be assumed to be, say 100 miles from the substation and, since the current passing round its secondary is the load current (see for example Fig. 1) the same vector may represent ($I_S$), the booster secondary current.

We can represent, to a suitable scale, the voltage at the terminals of the primary of said booster by the vector ($E_{TP}$) which is in phase with voltage of the step-up transformer at the generating station, and we can further represent the current in the primary of the booster by ($I_P$) and the capacity current of the last section of the line by ($I_{CL}$), and the quadrature voltage of boost (i. e., booster secondary voltage) by ($e_s$).

The reactive power input to the primary winding of the booster is $Q_P = E_{TP} I_P$. The reactive power output from the secondary winding of the booster is $Q_S = e_s I_L$.

As the primary and secondary copper loadings of a normal alternating-current transformer such as the said booster, are of necessity equal to one another, one obtains the result:

$$I_P = \frac{Q_P}{E_{TP}} = \frac{Q_S}{E_{TP}} = \frac{e_S \times I_{SL}}{E_{TP}}$$

where ($e_S$) is the E. M. F. in the secondary and ($I_L$) is the line current.

Passing now to sub-figure II of Fig. 8, the condition for half load at the receiver is shown and assuming that the regulator at the generating station has operated to cut down the voltage by one-half, we now have $I_{CL} = \frac{1}{2} I_{CL}$ and also $$L_P = \frac{\frac{1}{2} e_S \times \frac{1}{2} I_L}{\frac{1}{2} E_{TP}} = \frac{\frac{1}{4} KVA}{\frac{1}{2} E_{TP}} = \frac{1}{2} I_P$$

from which we see that the capacity current and the booster current are equal; in other words: balance has been preserved.

We have now to find how we can get an excess of capacity current so as to raise the voltage at the substation.

Consider sub-figure III of Fig. 8, in which the regulator is assumed still to have travelled the same distance as before, but the contacts with the step-up transformer have been differently arranged, so that the contact brush now engages with 62.5% (⅝) of the total voltage of the step-up transformer instead of 50%, the current in the secondary of the transformer being, by hypothesis, unaltered.

It will be observed that the increased terminal voltage (⅝$E_{TP}$) provides an increased secondary voltage (⅝$e_S$) and an increased current (⅝$I_{CL}$) but the primary current in ($I_P$) remains unaltered, for $$I_P = \frac{\frac{5}{8} e_S \times \frac{1}{2} I_L}{\frac{5}{8} E_{TP}} = \frac{1}{2} I_P \text{ (unaltered)}$$

This differential increase in the capacity current (viz from ½ to ⅝) takes place at each booster along the line, so that there is a cumulative increment of capacity current as we approach the generating station (toward left of diagram).

Referring here to the vector diagram of Fig. 10 relating to these operations the change just alluded to is indicated by sub-figures I and II, where ($I_R$) indicates the resultant current in each portion of the line before and after the change respectively and ($I_P$) and ($I_c$) represents booster current and capacity current. The differential increment ($ab$) in the capacity current passing through the line indicates an increment ($ef$) in the voltage which is in phase with the load current and the sum of all these increments, counting back to the generating station gives a total which builds up the substation voltage to the desired amount.

Sub-figure III of Fig. 10 indicates how, by running the independently-regulatable substation booster 9 (Fig. 3), a lagging primary current can be drawn over the line which can be arranged to reduce the aforesaid "differential" capacity current to any desired degree. The booster at the same time adds quadrature E. M. F. to the receiver voltage on the low tension side of the step-down transformer.

In sub-figure III ($I_P$) is the current in the primary of the line booster, in each case, and ($I_c$) the capacity current and ($I_{SB}$) the current of the substation booster 9 as we progress towards the generating station.

The diagram is supposed to deal with the first four boosters only, counting from the receiver station.

Referring now in detail to Figs. 3 and 3a, the primary 1a of the step-up transformer has a regulator 4a and tappings whereby the voltage of the secondary 2a may be raised or lowered to any moderate extent thus dispensing with tappings on the high tension side of the transformer, (which are inconvenient). Instead of the tappings for the regulator, on the low tension winding of the step-up transformer at the generating station, a control of the field of the generator of course in many cases be advantageous.

A star-star transformer, is shown throughout these diagrams, for the purpose of simplifying the explanation of my invention, and an inductively coupled delta winding 3a to avoid harmonics, is also shown.

In the matter of boost, at the sub-station end, the injected quadrature boost could easily be introduced inside the delta and an ordinary star-delta arrangement be adopted, if desired.

The secondary of the transformer 2a directly connects on to the line wire 5a. In Figs. 3 and 3a the capacity current is halved (reducing $I^2R$ losses) and flows both ways as shown at 16, but this does not thereby necessarily supersede the arrangement shown in Fig. 2.

The same scheme is repeated at booster windings 33 and at any number of suitable points along the line.

The capacitances 11, 12, 14a and 15 are, it will be understood, fictitious and merely represent the groups of small arrows contained in the brackets in Fig. 1, that is to say, they represent the natural condensive equivalents of the various sections of the line. At the receiving substation, the rectification of the P. F. of the load by the quadrature booster 9a, 10a involves a big demand for capacity current from the line (in order to neutralize the large lagging current of the booster primary); and in order not to cause voltage disturbances at parts of the line, it is desirable to introduce means for virtually eliminating the resistance and reactance of the part of the line from which this capacity current is drawn; so as to cause the length of the overhead line between booster 28 and the substation (there may be one or two hundreds of miles) to behave as though it were simply a bus bar of negligible resistance and reactance to the passage of the condenser currents.

There are a large number of booster points, such as 16, 33, though only two are shown.

The boosters at all these points along the line (except the substation booster at the receiving end) are plain, untapped, static transformers and consequently very cheap and requiring no attention.

It may here be explained that one of the objects of introducing the regulating switch 2, in Fig. 2 or the regulating switch 4a in Figs. 3 and 3a is, by controlling the excitations of all the boosters along the line from one common source, to do away with regulating switches on the boosters (except at the receiving substation) and so make it unnecessary to employ tapped transformers; thereby greatly cheapening the cost of same. How this result has been effected has been partially described in Fig. 2.

Referring now in detail to Figs. 4, 5, and 6. The generator 1b is connected to the primary 2b of the step-up transformer; whose secondary 3b is connected to line. At the substation a star-connected transformer 5b, 6b is shown. The quadrature booster 7b, 8b injects a leading voltage into the low tension. The amount of boost so injected may be caused to either bring the P. F. of the secondary circuit up to unity, as shown in vector diagram marked I in Fig. 9 (where $I^1$ S. L. represents the unity position) or it may be increased sufficiently to bring the power factor of the high tension circuit of the step-up transformer up to unity in which case the low tension substation P. F. will have a small lead, as shown by the vector I. S. in the No. II sub-figure of Fig. 9.

Where there is ample capacity current to neutralize the booster primary current it may be found desirable to inject a still greater boost into the substation low tension circuit, tending to cause the P. F. in winding $3b$ to run at a still greater leading P. F. and bringing the P. F. of the generator $1b$ up to unity.

This latter case would be represented by the vector $I^1s$ in sub-figure II of Fig. 9.

The amount of boost may be adjusted, by these three means, to cause the booster current to come into equality with the capacity current from a given selected length of overhead line contiguous to the substation, in the manner already described in Figs. 3 and $3a$.

These three stages are indicated by the vector diagrams in sub-figures I and II of Fig. 9. In sub-figure I the P. F. of the substation load current ($I_{SL}$) passing through the step-down transformer can be brought up to unity (where there is no synchronous condenser) by the reaction of the leading boost ($e_{bo}$) in the low tension circuit, though at the expense of a heavy lagging current flowing into the booster primary, which, however, is nullified by capacity current drawn from the line, as already discussed under Fig. 3.

In sub-figure II of Fig. 9 a very big forward lead is given to the secondary current ($I^1s$), the reactive E. M. F. ($e_{xs}$) due to which may be partly neutralized by a quadrature component ($e_{c\ res}$) and an in-phase ($e_{rs}$). The surplus quadrature booster component ($e_{cs}$) reappears on the primary side (less the reactive drop in the transformer) as ($e_{cp}$), which represents surplus quadrature boost, and which is operative in giving an injection of leading E. M. F. at the generating station tending to produce the aforesaid leading current there. Thus the reactance of the generator windings and of the step-up transformer windings is drawn upon to assist in neutralizing the excess of capacity current at the receiver end of the line.

The vector ($I_s$) shows, roughly, the phase of the secondary current that would obtain if the excess of boost ($e_{cs}$) were not introduced, with the corresponding value ($I_P$) in the primary.

Referring now in detail to Fig. 7. $1c$ is the three-phase primary of a "Scott" step-up transformer ABCD, whose secondary system $2c$ is a two-phase 5-wire system, having a neutral conductor $3c$.

A similar transformer $4c$, $5c$, is employed at the receiving substation. A quadrature booster $6c$, $7c$, has its primary $6c$ connected with line wire A, and its secondary $7c$ inserted in series in the line wire B.

Similarly, the primary $8c$ of the booster $8c$, $9c$, has its secondary $9c$ connected in series with the line wire A.

The object of the change from 3-phase working to 2-phase working is to meet the conditions where, in the case of an exceedingly long line, the voltage of transmission has had to be raised so much that the capacity current far out-weighs the booster current.

Now, if we have to transmit a definite load in kilowatts, it is a well known fact that, given two cases in which the voltage between any line-wire and earth is equal, the two-phase system will require 50% more current per phase.

This means 50% more reactive drop per phase and consequently 50% more voltage required in the booster secondary.

Hence, 50% more voltage, and 50% more current, combine to demand 1.25 times the original primary current of the 3-phase booster, while the capacity current per wire remains substantially the same. It thus becomes allowable to further raise the voltage and thus to go to still greater distances, before the two currents balance out.

Figs. 8, 9, and 10 are associated with Fig. 3 and Figs. 4, 5, and 6 have been referred to in detail in the description of these figures.

Referring now in detail to Figs. 11 and $11a$, $1d$ is the primary of a step-up transformer and $2d$ its secondary. Reference character $3d$ represents one of the line wires, $6d$ is the terminal of one of the primary windings $4d$ of the booster $4d$, $5d$, which is continually on the circuit ($5d$ being a secondary winding of this booster). $8d$ is an instantaneous circuit breaker, operating under emergency conditions (failure of one transmission circuit). $7d$ is the terminal of the continued line wire. $11d$ is a primary winding of a second booster $11d$, $12d$, ($12d$ being a secondary winding). $13d$ is a wire leading to switch $14d$ which is an instantaneous "closing" switch, interlocked with and arranged to operate slightly in advance of the circuit breaker $8d$.

$18$, $19$, $20$, $21$ and $22$ are similar parts to $4d$, $5d$, $12d$ and $14d$ belonging to a second switching station near the other end of the line.

$23$ is the primary of a step-down transformer at the receiving end of the line and $24$ is its secondary.

The closing switch $14d$ is operated by a relay actuated by a current transformer in the main circuit and can close within $\frac{1}{10}$ of a second.

This momentarily short circuits the booster secondary $12d$, the primary $11d$ being already excited, but in a very minute fraction of a second the circuit breaker $8d$, which was also actuated by the same line relay opens and the line current now passes through the two booster secondaries $5d$ and $12d$ in series.

An interlocking of the two switches can be avoided, if desired, by arranging for two sets of relays—one for each switch—and arranging that the relay belonging to $8d$ does not receive its current until there has been a preliminary movement on the part of the relay belonging to $14d$. (The interlocks are desirable to be avoided if possible, as affording a slight tendency to delay the operation of both switches.)

Under the arrangement proposed, the main transmission circuit cannot, under any conceivable circumstances, be interrupted during the insertion of the booster secondary $12d$, so long as the switch $14d$ closes before $8d$ opens; and additional precautions, based on the relative movements of the circuit breakers themselves, whereby any tendency to a leading movement on the part of the breaker $8d$ would close contacts and introduce (by means of auxiliary circuits fed from accumulators and brought into operation by said contacts), could easily be devised, in such a way as not to lower the speed of operation appreciably, and to retain the highest rapidity possible in the case of the switch $14d$.

The lower pair of boosters are merely a repeat of the upper pair.

Other pairs may be introduced along the line where considered desirable.

It may be explained that both transmission lines are identical, and that normally the switches 8d and 25 are closed.

The emergency arrangement is to deal with the first instant after the faulty line has been thrown out of commission. Suppose, for example, that one line has been struck by lightning. There are circuit breakers (not shown on diagram) at each end of each transmission line, or section of a line, as in ordinary practice, and directly one line is struck the two circuit breakers at the end of that line operate, by standard methods, to cut it off.

Until, however, it is cut off, the generator is under short-circuit and is losing its field (and is racing). It is during this method that it is desired to bring the booster 12d into action; so that, by the time the ordinary circuit breakers have relieved the generator short-circuit, the emergency booster 12d shall have begun injecting boost into the remaining line, the impedance of which has been increased and over one part of which, at least, double the normal current has to be forced.

By putting in circuit breakers which are comparable in speed with those cutting off the extremities of the two lines, it can be arranged that the emergency boost is injected into the circuit practically simultaneously with the instant that the line-sectionalizing breakers on the two ends of faulty line shall have completely interrupted the arc.

The term "emergency booster" has been employed to distinguish this piece of apparatus, which is designed for an extremely short-time rating and of specially high inductance (to reduce the shock, when under direct short-circuit), from the ordinary line boosters operating under normal conditions.

While I have described my invention in certain preferred embodiments, I realize that modifications in the circuit arrangements may be made and I intend no limitations upon my invention other than may be imposed by the scope of the appended claims.

I claim:

1. In a power transmission system, a polyphase power transmission line having substantial capacity to earth, a multiplicity of capacity neutralizing means spaced along the line and individual to each phase, each capacity neutralizing means including a primary winding and a secondary winding, a power source of alternating current connected to one end of said transmission line, a load connected to the other end of said transmission line, a reactance member inserted in the line adjacent each of the primary windings of said capacity neutralizing means, the primary winding of each of said capacity neutralizing means being connected between points on the transmission line and the earth in parallel with the capacity formed by the transmission line with respect to earth, and the secondary windings of each of said capacity neutralizing means being disposed in series with the transmission line, said primary and secondary windings being magnetically coupled with each other and said reactance members each having a value of reactance tending to increase the amplitude of the current through said primary windings.

2. In a power transmission system, a polyphase power transmission line having substantial capacity to earth, a multiplicity of capacity neutralizing mean spaced along the line and individual to each phase, each capacity neutralizing means including a primary winding and a secondary winding, a power source of alternating current connected to one end of said transmission line, a load connected to the other end of said transmission line, means for regulating the voltage supplied to said transmission line according to the load on said line, a reactance member inserted in the line adjacent each of the primary windings of said capacity neutralizing means, the primary winding of each of said capacity neutralizing means being connected between points on the transmission line and the earth in parallel with the capacity formed by the transmission line with respect to earth, and the secondary windings of each of said capacity neutralizing means being disposed in series with the transmission line, said primary and secondary windings being magnetically coupled with each other and said reactance members each having a value of reactance tending to increase the amplitude of the current through said primary windings.

ALFRED MILLS TAYLOR.